(12) United States Patent
Chen

(10) Patent No.: US 11,550,139 B2
(45) Date of Patent: Jan. 10, 2023

(54) NIGHT-VISION OPTICAL DEVICE WITH AUTOMATIC INFRARED-CUT FUNCTION

(71) Applicant: CHANGING INTERNATIONAL COMPANY LIMITED, Kowloon (HK)

(72) Inventor: Han-Che Chen, Taipei (TW)

(73) Assignee: CHANGING INTERNATIONAL COMPANY LIMITED, Kowloon (HK)

( * ) Notice: Subject to any disclaimer, the term of this patent is extended or adjusted under 35 U.S.C. 154(b) by 323 days.

(21) Appl. No.: 17/085,902

(22) Filed: Oct. 30, 2020

(65) Prior Publication Data

US 2022/0137389 A1 May 5, 2022

(51) Int. Cl.
| | |
|---|---|
| G02B 23/12 | (2006.01) |
| H04N 5/225 | (2006.01) |
| H04N 5/235 | (2006.01) |
| G02B 23/18 | (2006.01) |
| G02B 1/11 | (2015.01) |

(52) U.S. Cl.
CPC ............... G02B 23/12 (2013.01); G02B 1/11 (2013.01); G02B 23/18 (2013.01); H04N 5/2254 (2013.01); H04N 5/2353 (2013.01)

(58) Field of Classification Search
CPC ........ G02B 23/12; G02B 23/18; G02B 23/00; H04N 5/2254; H04N 5/2353
See application file for complete search history.

(56) References Cited

U.S. PATENT DOCUMENTS

| | | | | |
|---|---|---|---|---|
| 5,561,557 A | * | 10/1996 | Le Bris ................... | G02B 23/12 |
| | | | | 250/556 |
| D752,670 S | * | 3/2016 | Chen ........................... | D16/132 |
| D851,153 S | * | 6/2019 | Chen ........................... | D16/133 |
| 10,466,467 B2 | * | 11/2019 | Chen ..................... | F21V 19/003 |
| 2012/0098972 A1 | * | 4/2012 | Hansen .................... | G06T 11/60 |
| | | | | 348/E5.09 |
| 2018/0180384 A1 | * | 6/2018 | Zhang ....................... | F41G 3/08 |

* cited by examiner

*Primary Examiner* — Jia X Pan
(74) *Attorney, Agent, or Firm* — Muncy, Geissler, Olds & Lowe, P.C.

(57) ABSTRACT

A night-vision optical device is provided, including a main body, a lens module, and a display module. The lens module includes an aperture element, a lens element, an electromagnetic driving assembly, an image sensor, and a digital signal processor. In response to an ambient light level around the night-vision optical device satisfying a predetermined condition, the digital signal processor (DSP) controls the night-vision optical device to enter a first mode, and controls the electromagnetic driving assembly to drive a first portion of a filter member to a first position to align an optical axis of the lens element. In response to the ambient light level not satisfying a predetermined condition, the DSP controls the night-vision optical device to enter a second mode, and controls the electromagnetic driving assembly to drive the second portion of the filter member to the first position.

12 Claims, 10 Drawing Sheets

NIGHT-VISION OPTICAL DEVICE WITH AUTOMATIC INFRARED-CUT FUNCTION

BACKGROUND OF THE INVENTION

Field of the Invention

The application relates in general to an optical device, and in particular to a night-vision optical device with an automatic infrared-cut function.

Description of the Related Art

Thanks to the ongoing development of technology, electronic products such as optical binoculars and monoculars are becoming increasingly versatile. With continuous improvements in performance, the application of these devices will improve. For example, optical binoculars and monoculars used in hunting are often equipped with night-vision functionality, and they include an infrared light-emitting unit that emits infrared light, which allows the users to see more clearly at night. However, users demand high quality and versatility from their binoculars and monoculars. Therefore, it is an important issue to provide a device that is more user-friendly and that can be more widely used.

BRIEF SUMMARY OF INVENTION

To address the deficiencies of conventional optical binoculars and monoculars, an embodiment of the invention provides a night-vision optical device, comprising: a main body, an ambient light sensor, a lens module, and a display module. The ambient light sensor is configured to detect ambient light level around the night-vision optical device. The lens module is disposed on one side of the main body, wherein the lens module includes: an aperture element, comprising an aperture hole and a filter portion; a lens element; an electromagnetic driving assembly, comprising a filter member having a first portion and a second portion; an image sensor; and a digital signal processor. The display module is disposed in the main body and electrically connected to the lens module, and configured to display an image captured by the image sensor. In response to the ambient light level satisfying a predetermined condition, the digital signal processor controls the night-vision optical device to enter a first mode, and controls the electromagnetic driving assembly to drive the first portion of the filter member to a first position to align an optical axis of the lens element In response to the ambient light level not satisfying a predetermined condition, the digital signal processor controls the night-vision optical device to enter a second mode, and controls the electromagnetic driving assembly to drive the second portion of the filter member to the first position to align the optical axis of the lens element.

In some embodiments, the aperture hole is located at the center of the aperture element, and has a first outer diameter. The filter portion has a second outer diameter, and the second outer diameter is longer than the first outer diameter.

In some embodiments, the filter portion is a ring-shaped element made of black PMMA (polymethyl methacrylate) or PC (polycarbonate). In addition, the second outer diameter is 38 mm, and the first outer diameter is 6.9 mm, and the thickness of the aperture element is 1 mm.

In some embodiments, the first portion and the second portion of the filter member are implemented by an IR-cut coating and an anti-reflection coating covering on the same glass.

In some embodiments, the first mode is an IR-cut mode, and visible light is blocked by the filter portion, and an infrared component of an incident light is blocked by the IR-cut filter.

In some embodiments, the second mode is a night mode, and the infrared component passes through the aperture element, the lens element, and the second portion, and the image sensor captures the infrared component to generate an infrared image.

In some embodiments, the aperture element has a first effective aperture of F5.5 for the visible light in the first mode, and has a second effective aperture of F1.3 for the infrared component in the second mode.

In some embodiments, the digital signal processor sets a first exposure value of the image sensor in the first mode, and sets a second exposure value of the image sensor in the second mode. The second exposure value is greater than the first exposure value.

In some embodiments, the first exposure value and the second exposure value represent a first exposure time and a second exposure time, respectively. The image sensor uses the first exposure time or the second exposure time set by the digital signal processor for an automatic electronic shutter to capture the image.

In some embodiments, a first central axis of the aperture element, an optical axis of the lens element, a second central axis of the image sensor, and a third central axis of the display module are coincidental.

In some embodiments, the night-vision optical device further includes a first light source assembly and a second light source assembly. The first light source assembly includes a first light source and a first lens, and the first lens is configured to emit a first infrared light in the night mode. The second light source assembly includes a second light source and a second lens, and the second lens is configured to emit a second infrared light in the night mode. The first light source assembly and the second light source assembly are respectively disposed on two sides of the lens module, the first light source emits a long-range light through the first lens, and the second light source emits a close-range light through the second lens, wherein the focal length of the first lens is greater than the focal length of the second lens.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1A:
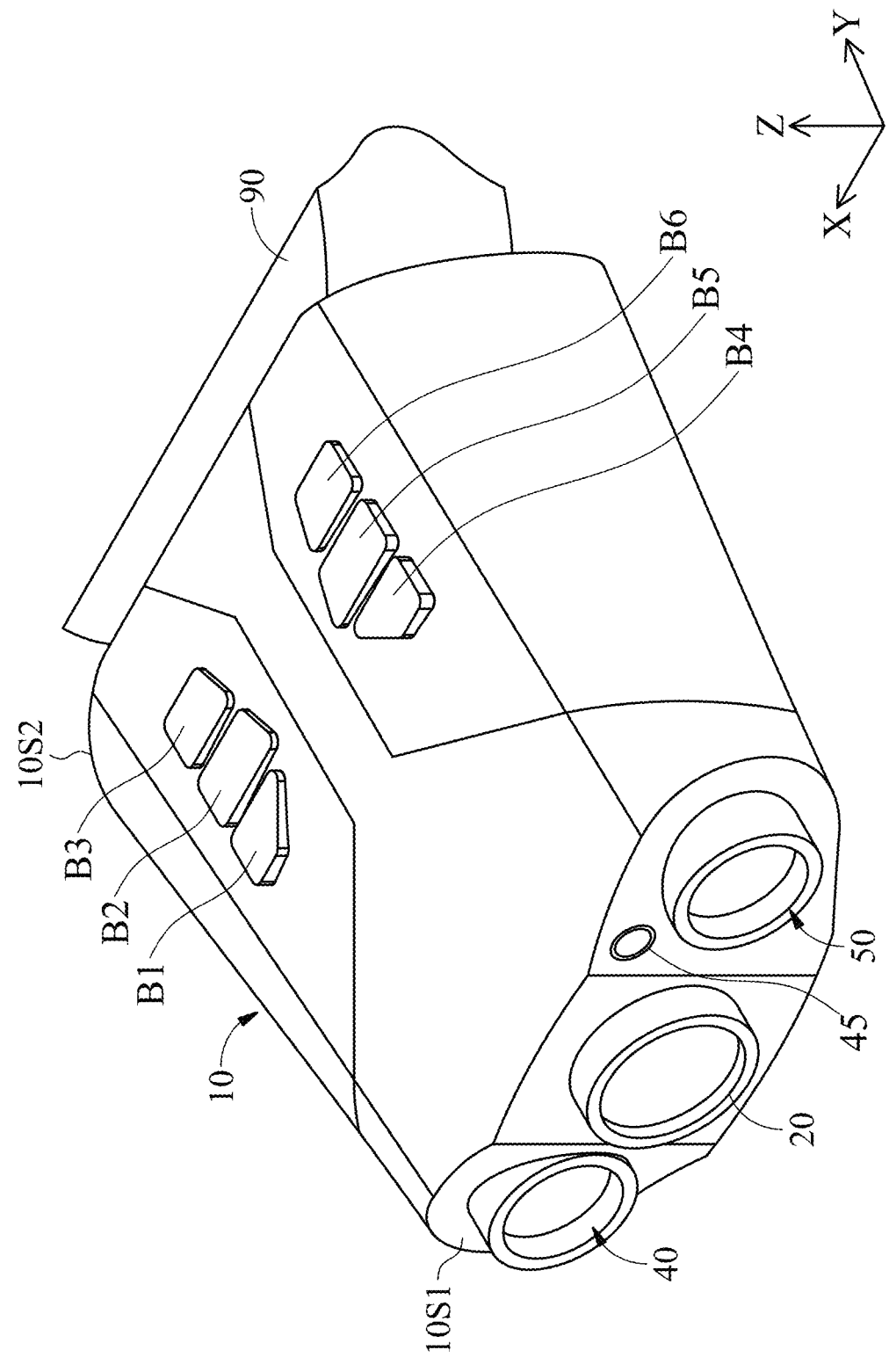
FIG. 1A is a front perspective view diagram of a night-vision optical device according to an embodiment of the invention.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that elements specifically described or illustrated may exist in various forms well known to those skilled in the art. In addition, when a layer is "on" another layer or substrate, it may mean "directly" on the other layer or substrate, or it may mean that another layer is interposed between the certain layer and the other layer or substrate.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The making and using of the embodiments of the night-vision optical devices are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1B:
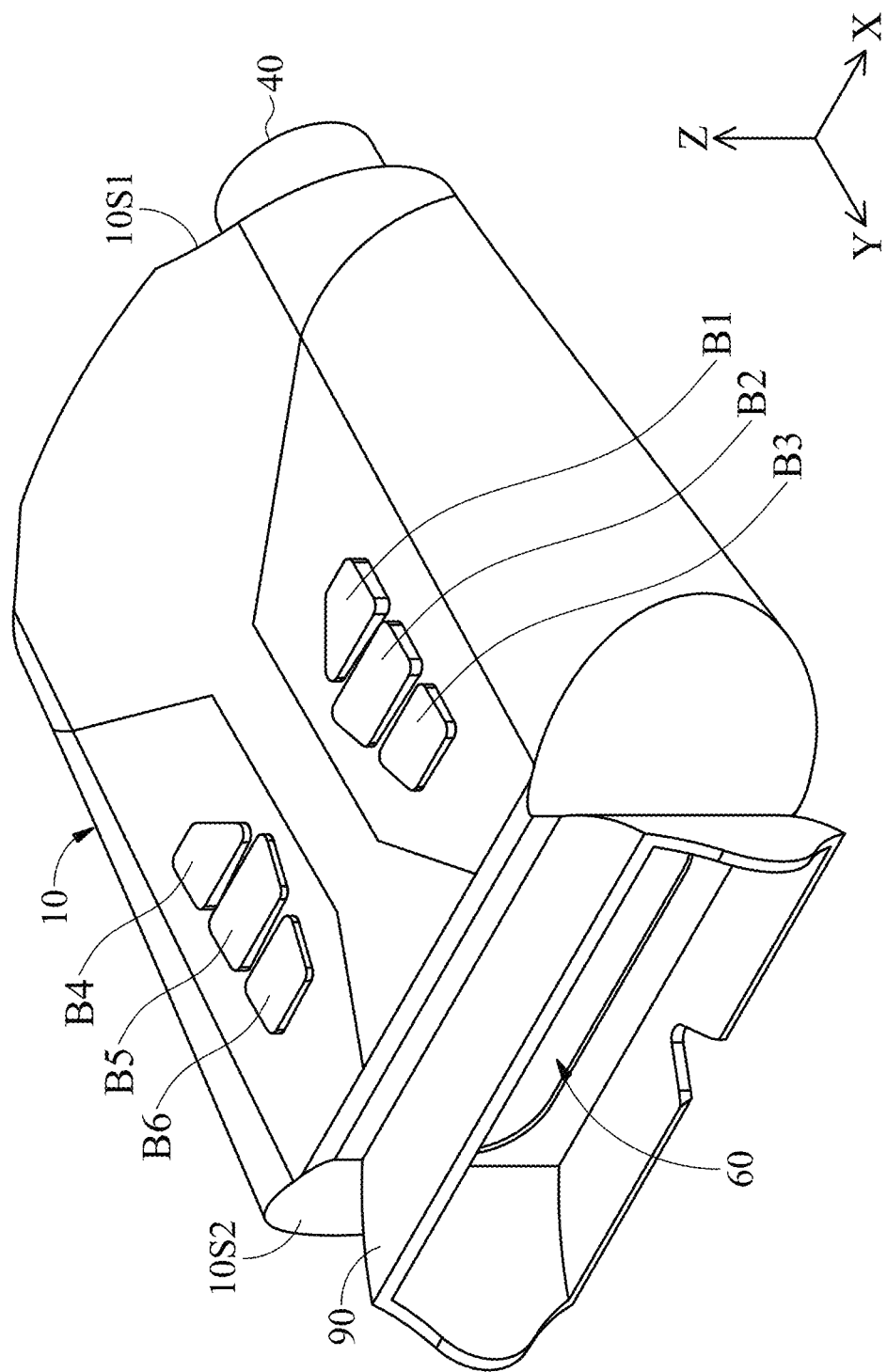
FIG. 1B is a rear perspective view diagram of the night-vision optical device in FIG. 1A.

FIG. 1A is a front perspective view diagram of a night-vision optical device according to an embodiment of the invention. FIG. 1B is a rear perspective view diagram of the night-vision optical device in FIG. 1A.

Referring to FIG. 1A and FIG. 1B, in some embodiments, the night-vision optical device 100 may be a binocular or monocular with a light-emitting function, or a night vision binocular or monocular which can be used to observe, aim, and zoom in on a scene or target, for example, used for hunting games. In some other embodiments, the night-vision optical device 100 may be a sighting device or a surveillance camera that can be used to observe on a scene in the daytime and at night. The detailed structure of the night-vision optical device will be described below.

Figure 2:
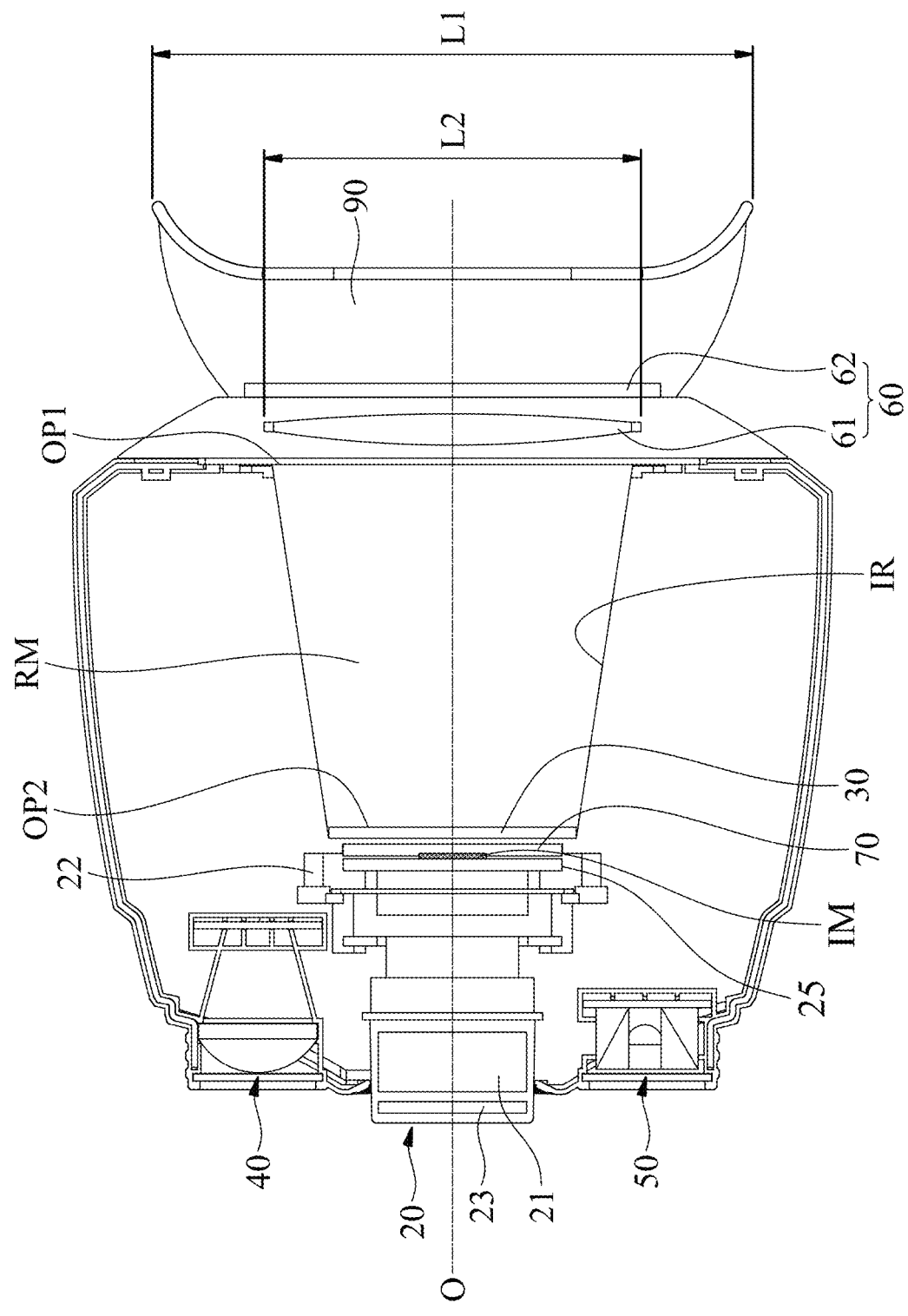
FIG. 2 is a top view schematic diagram of the night-vision optical device in FIG. 1.

FIG. 2 is a top view schematic diagram of the night-vision optical device in FIG. 1.

Referring to FIGS. 1A-1B and FIG. 2, the night-vision optical device 100 includes a main body 10, a lens module 20, a display module 30, a first light source assembly 40, a second light source assembly 50 and an eyepiece assembly 60. The main body 10 includes a first side 10S1 and a second side 10S2 opposite each other. The lens module 20, the first light source assembly 40 and the second light source assembly 50 are disposed on the first side 10S1. The electromagnetic driving assembly 25 and the display module 30 are disposed in the main body 10, and the eyepiece assembly 60 is disposed on the second side 10S2. In some embodiments, the night-vision optical device 100 is not equipped with the second light source assembly 50.

The night-vision optical device further includes a plurality of operation buttons B1 to B6 disposed on the upper side of the main body 10. The operation buttons B1 to B6 are electrically connected to the lens module 20, the display module 30, the first light source assembly 40, and the second light source assembly 50. These buttons B1 to B6 are configured to operate the different functions of the aforementioned modules and assemblies (20, 25, 30, 40 and 50). For example, a user can turn on/off the modules and assemblies, adjust the brightness or sight of brightness, zoom in or zoom out the displayed image, or enable the function of taking photos or recording videos.

The aforementioned lens module 20 may be a camera device, which is configured to capture image. The lens module 20 includes a lens element 21, a support frame 22, an aperture element 23, an electromagnetic driving assembly 25, and a circuit board 70 (e.g., a flexible printed circuit board). A image sensor IM (for example, an image sensor) is disposed on the circuit board 70. The support frame 22 is configured to support the lens element 21 and the electromagnetic driving assembly 25, so the image sensor IM can receive light from the outside through the aperture element 23, the lens element 21 and a filter member FM of the electromagnetic driving assembly 25 along the optical axis O direction of the lens element 21 to obtain an image. In some embodiments, the aperture element 23 may be a dual-purpose aperture that is implemented by a ring-shaped element made of black PMMA (polymethyl methacrylate) or PC (polycarbonate) with an empty hole at the center, where aperture size of the aperture element 23 may be F5.5 in the daytime, and may be F1.3 at night, but the invention is not limited thereto. More details of the aperture element 23 will be described later.

In some embodiments, the image sensor IM may be implemented by an integrated circuit such as a complementary metal-oxide semiconductor (CMOS) sensor. Alternately, in other embodiments, the image sensor IM may be implemented by a charge-coupled device (CCD) sensor.

The display module 30 can be, for example, a liquid-crystal display having an LCD (liquid-crystal display) panel, electrically connected to the lens module 20, and used to display images acquired by the lens module 20.

The first light source assembly 40 and the second light source assembly 50 are used to emit lights to illuminate the front of the night-vision optical device 100, that is, the front of the first side 1051. For example, the first light source assembly 40 and the second light source assembly 50 may be light-emitting assemblies that emit visible lights. In some embodiments, they may also emit infrared (IR) lights. The ambient light sensor (ALS) 45 is electrically connected to the circuit board 70, and is used to detect the strength of the ambient light of the night-vision optical device 100. For example, the ALS 45, which can be a single value photodetector or photodiode, may provide measurements of ambient light intensity which match the human eye's response to light under a variety of lighting conditions.

Figure 3:
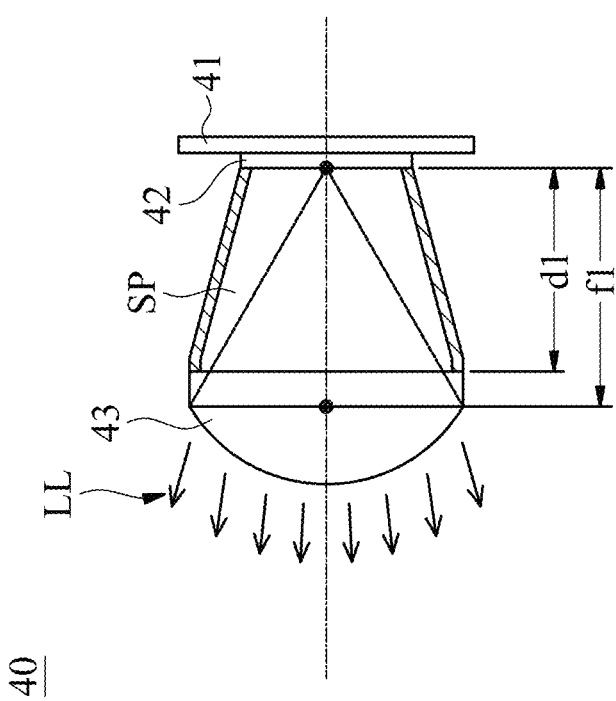
FIG. 3 is a schematic diagram of the first light source assembly.

FIG. 3 shows a schematic diagram of the first light source assembly 40. As shown in FIG. 3, the first light source assembly 40 has a first circuit board 41, a first light source (or first light-emitting unit) 42 and a first lens 43. In some embodiments, the first circuit board 41 can be connected to the main circuit board (not shown) of the night-vision optical device 100. For example, the main circuit board may be disposed in the main body 10, and located on the top side of the main body 10. In addition, a digital signal processor (DSP) 72 (or a microcontroller) is disposed on the circuit board 70 for controlling operations of the night-vision optical device 100. In some other embodiments, the first circuit board 41 can be connected to main circuit board (not shown) of the night-vision optical device 100, and the DSP or microcontroller can be disposed on the main circuit board. For example, the main circuit board may be disposed in the main body, and located on the top side of the main body 10.

The first light source 42 is disposed on the first circuit board 41 for emitting light (first light). There is an accommodating space SP between the first lens 43 and the first light source 42, and this space SP has a tapered structure. A first distance d1 is formed between the first lens 43 and the first light source 42. The light emitted by the first light source 42 passes through the first lens 43, so that a long-range (or distant view) light LL is provided from the night-vision optical device, to illuminate the front of the night-vision optical device. In some embodiments, the first lens 43 is a convex lens, such as a plano-convex lens, but not limit thereto.

Figure 4:
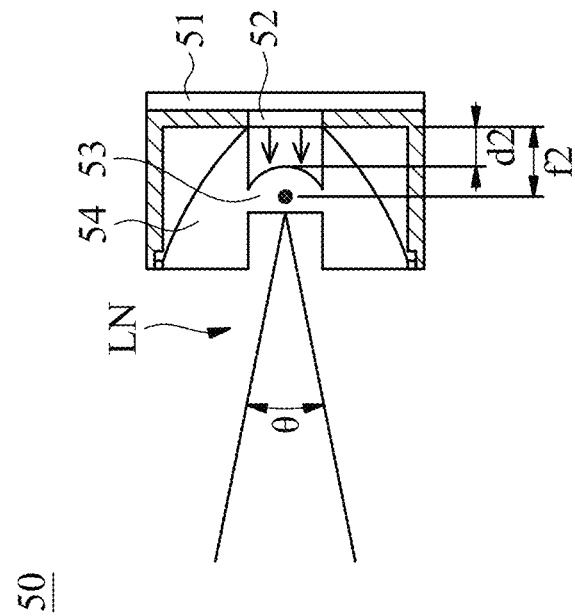
FIG. 4 is a schematic diagram of the second light source assembly.

FIG. 4 shows a schematic diagram of the second light source assembly 50. As shown in FIG. 4, the second light source assembly 50 has a second circuit board 51, a second light source (or second light-emitting unit) 52, a second lens 53 and a condensing (or spotlight) cup body 54. The second circuit board 51 may also be connected to the main circuit board of the night-vision optical device. The first circuit board 41 and the second circuit board 51 may be flexible printed circuit boards, and the second light source 52 is disposed on the second circuit board 51, and configured to emit light (second light). The second lens 53 is disposed in the condensing cup body 54. In some embodiments, the second lens 53 is a convex lens, such as a convexo-plane lens, but not limit thereto. A second distance d2 is formed between the second lens 53 and the second light source 52. The light emitted by the second light source 52 passes through the second lens 53, so that a close-range light LN is emitted from the second light source assembly, to illuminate the front of the night-vision optical device. With the condensing cup body 54 and the second lens 53, the angle θ of the close-range light LN emission is reduced, and the light can be effectively collected to improve the emission effect of the light source. In some embodiments, the emitting angle θ of the close-range light LN is about 15 degrees.

In some embodiments, the first distance d1 is from 18 to 20 mm, and the first distance d2 is from 4.5 to 5.5 mm. In some embodiments, the first distance d1 is at least 12.5 mm greater than the second distance d2.

In some embodiments, the outer radius of curvature of the first lens 43 may be 20 to 25 mm, and the first lens 43 has a focal length (or distance) f1 of 16 to 20 mm. In some embodiments, the focal length f1 is 18 mm. In some embodiments, the outer radius of curvature of the second lens 53 may be 5.5 to 7 mm, and the second lens 53 has a focal length f2 of 5 to 6 mm. In some embodiments, the focal length f2 is 5.5 mm.

In this way, using the first and second lenses 43 and 53 which have two different focal lengths, respectively, the night-vision optical device can emit a long-range light LL (through the first lens 43) and a near-range light LN (through the second lens 53). This allows the night-vision optical device to illuminate the positions in front of it at different distances. For example, the first light source assembly 40 emits long light LL to illuminate the position 250~300 yards away from the night-vision optical device; and the second light source assembly 50 emits close light LN to illuminate the position 80~120 yards away from the night-vision optical device. By irradiating the positions at different distances from the night-vision optical device, the night-vision optical device can have a better field of view, allowing the user to observe a wider scene or target.

It is worth noting that the aforementioned first light source assembly 40 and second light source assembly 50 are disposed on two sides (left and right sides) of the lens module 20. Alternatively, the lens module 20 is located between the first light source assembly 40 and the second light source assembly 50 in the direction that is perpendicular to the optical axis O of the lens element 21.

In some embodiments, the aforementioned first light source 42 and second light source 52 may be visible light or infrared (IR) LED units or combinations, each LED light source may include one or more light emitting diodes, which can emit visible light or infrared light. For example, when using the night-vision optical device at night, the user can press the operation button(s) B to turn on the first light source assembly 40 and the second light source assembly 50 to operate, to provide visible light or infrared light, and the light is reflected by the target and enters the lens module 20 to capture images. In some embodiments, the first and second light sources 42 and 52 having a plurality of light emitting diodes may be arranged in a matrix (e.g., a 3×3 or 3×4 matrix).

Referring to FIG. 2, the eyepiece assembly 60 of the night-vision optical device is disposed on the second side 10S2 of the main body 10, and includes an eyepiece lens 61 and an eyepiece plane lens 62. The eyepiece plane lens 62 is located outside the eyepiece lens 61 and covers the eyepiece lens 61 to provide a protection function. In some embodiments, the eyepiece lens 61 may be a biconvex lens, wherein the radius of curvature of the convex surface which is farther away from the night-vision optical device may range from 270 mm to 320 mm, while the radius of curvature of the closer one on another side may range from 90 mm to 135 mm. Viewing the display module 30 in the main body 10 through the eyepiece lens 61 can have a magnifying effect to enhance a good viewing experience.

Please continue to refer to FIG. 2, the night-vision optical device further includes an observation room RM, disposed in the main body 10. The observation room RM is located between the display module 30 and the eyepiece assembly 60, and has a trapezoidal or tapered structure. The observation room RM includes a first opening OP1 and a second opening OP2, which are respectively adjacent to the eyepiece assembly 60 and the display module 30, wherein the second opening OP2 of the observation room RM is smaller than the first opening OP1. In this embodiment, the user sees the image on the display module 30 through the eyepiece assembly 60 and the observation room RM. Since the observation room RM has a structure that is tapered from the end of the eyepiece toward the display end, the user can more easily concentrate on the image on the display module 30, and the device can provide more comfort during use.

In some embodiments, an inner wall IR of the observation room RM is formed with a scattering structure. The scattering structure may present a wave shape, and is configured to scatter or reflect the light from the display module 30 to provide a better visual experience.

The night-vision optical device further comprise an eyeshield 90 located on the second side 10S2 of the main body 10. The eyeshield 90 is provided around the eyepiece assembly 60 and covers at least a portion of the eyepiece lens 61. In some embodiments, the eyeshield 90 may be made of silicone to improve comfort. In the long axis direction of the eyeshield 90, the length L1 of the eyeshield 90 is at least 40 mm larger than the length L2 of the exposed eyepiece lens 61 and eyepiece plane lens 62 (that is, the area where the eyepiece lens 61 and eyepiece plane lens 62 are not covered by the eyeshield 90). For example, the length L1 may be 120~130 mm, and the length L2 may be 80~90 mm.

Figure 5A:
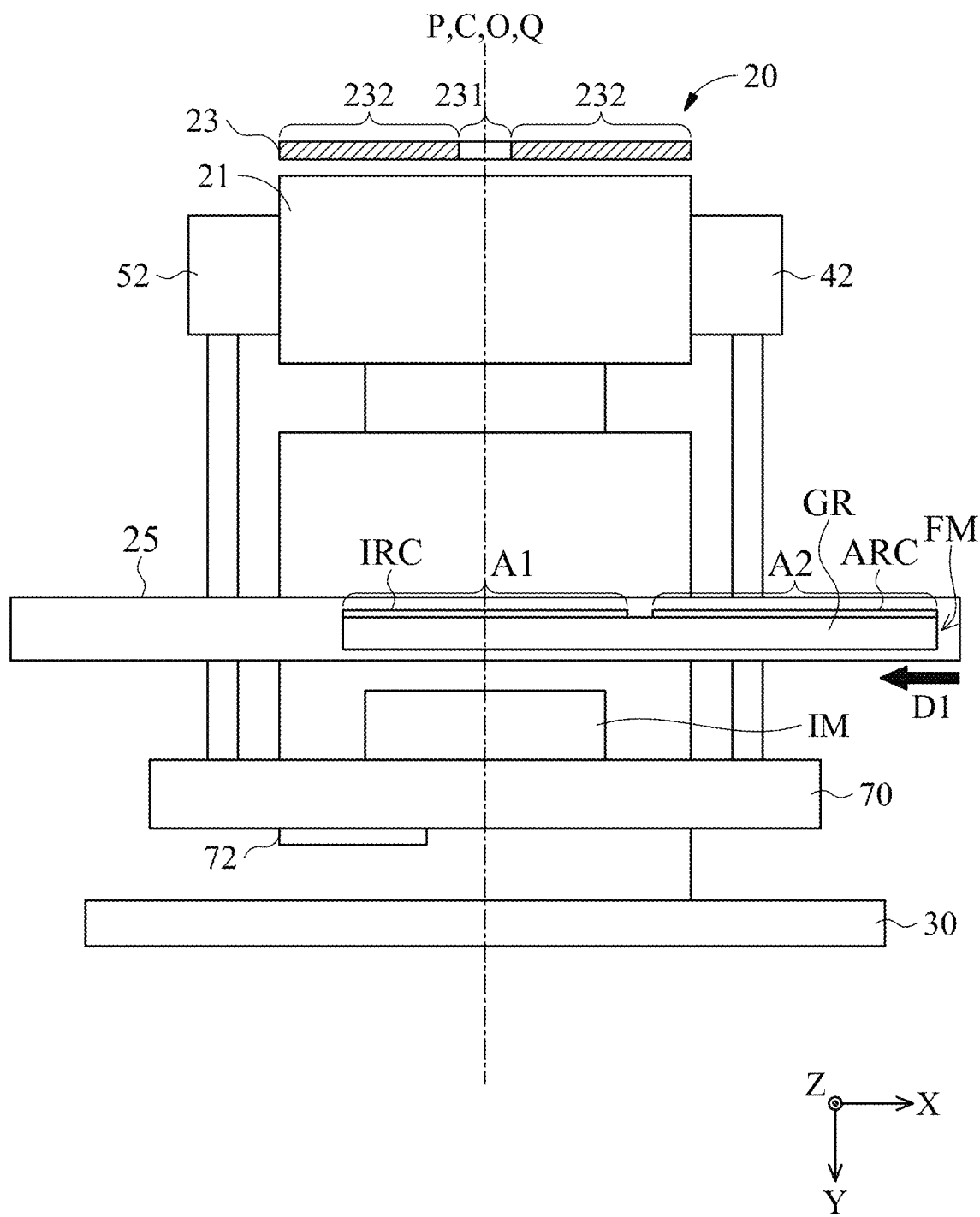
FIGS. 5A and 5B are top view perspective diagrams of the configuration of the lens module, the display module, the IR light module in accordance with an embodiment of the invention.
Figure 5B:
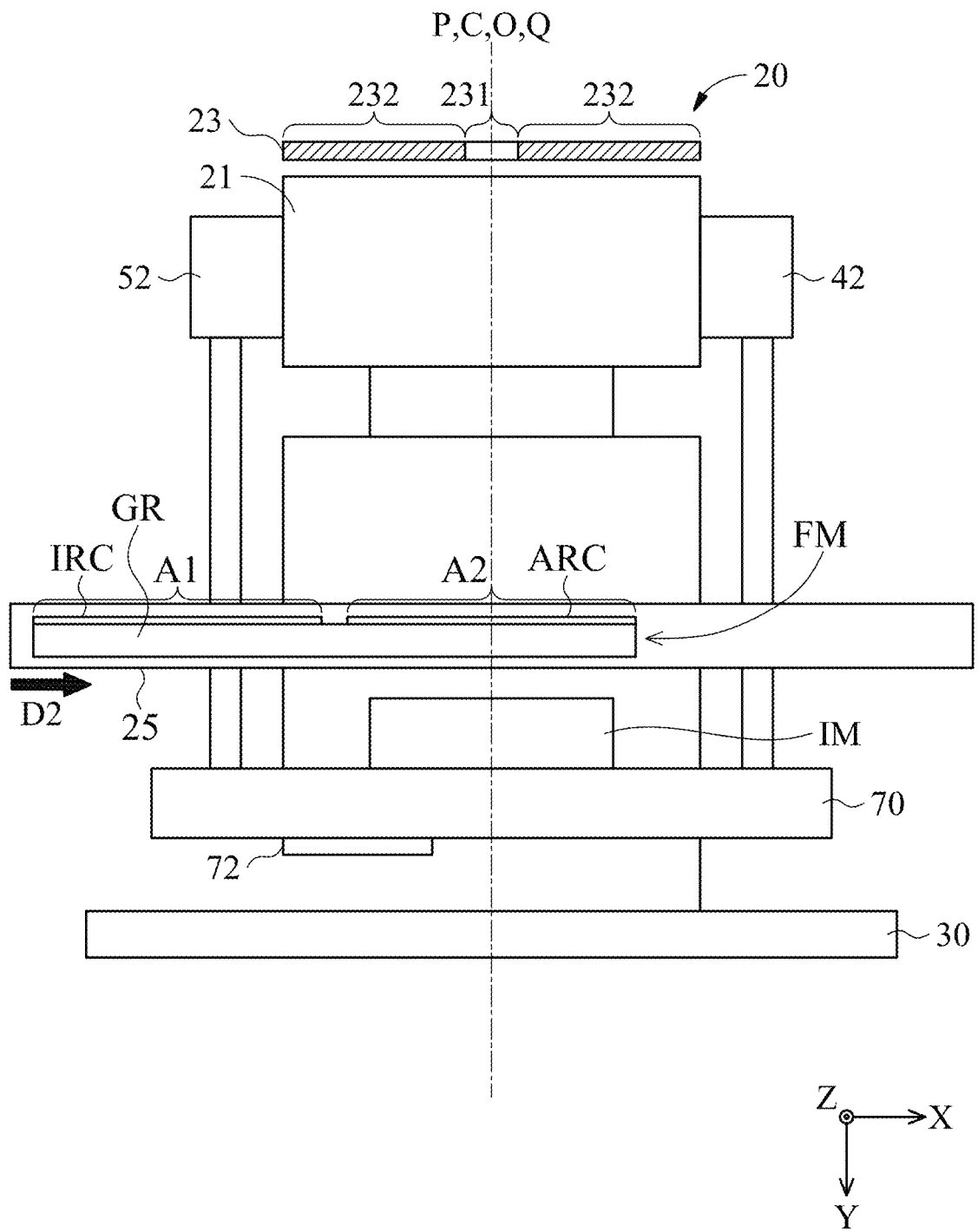
Figure 5C:
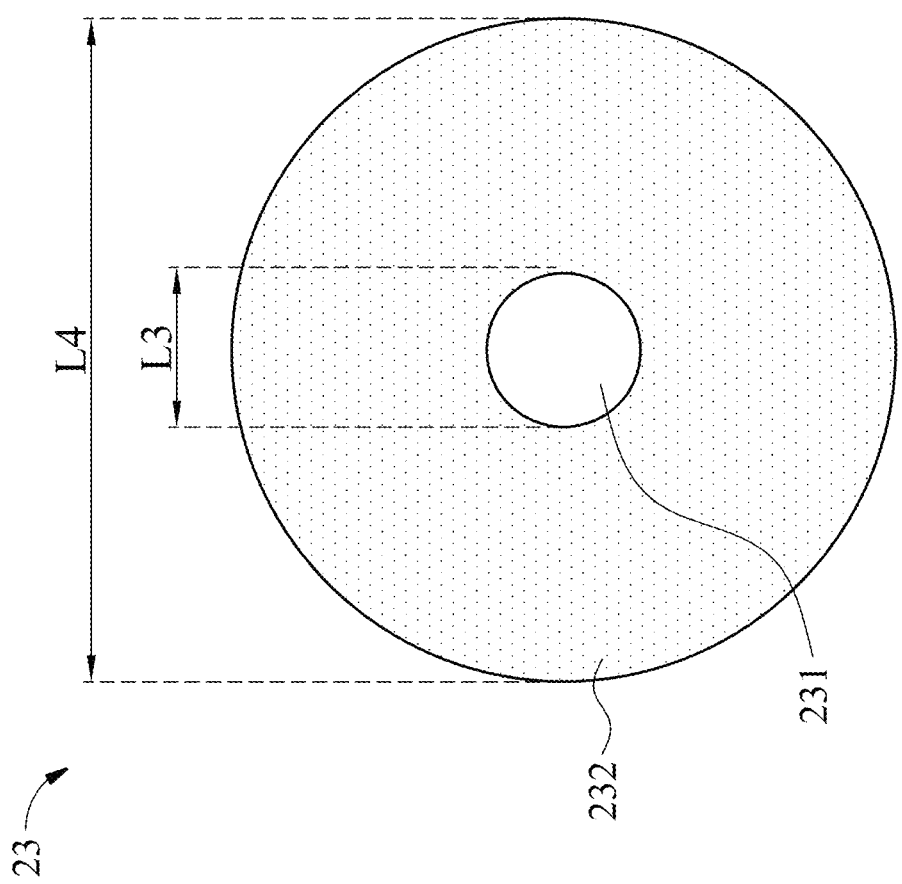
FIG. 5C is a diagram of the aperture in accordance with the embodiment of FIGS. 5A-5B.
Figure 5D:
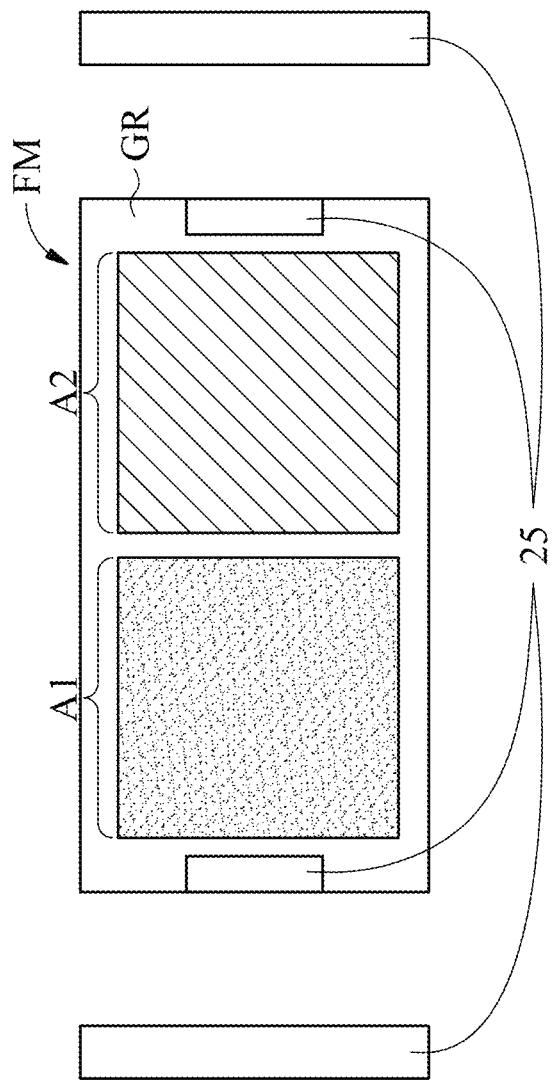
FIG. 5D is a schematic diagram of the filter member and the electromagnetic driving assembly in accordance with the embodiment of FIGS. 5A-5B.

FIGS. 5A and 5B are top view perspective diagrams of the configuration of the lens module, the display module, the IR light module in accordance with an embodiment of the invention. FIG. 5C is a diagram of the aperture in accordance with the embodiment of FIGS. 5A-5B. FIG. 5D is a schematic diagram of the filter member and the electromagnetic driving assembly in accordance with the embodiment of FIGS. 5A-5B.

Referring to FIGS. 5A and 5B, it should be noted that the central axis P of the aperture element 23, the optical axis O of the lens element 21, the central axis Q of the image sensor IM, and the central axis C of the display module 30 are coincidental. Therefore, a user can see the image capture from the lens module 20 on the display module 30 and the target is accurately aimed at.

Please refer to FIGS. 1A-1B and FIGS. 5A-5B, in an embodiment, the button B1 may be configured to switch between a plurality of manual modes and an automatic mode of the night-vision optical device 100. For example, the manual modes may include a IR-cut mode, and a night mode. The switching between the IR-cut mode, automatic mode, and night mode is in connection with the button B1 and the electromagnetic driving assembly 25. For example, the user may press the button B1 repeatedly to switch between the IR-cut mode, automatic mode, and night mode.

The filter member FM includes a first portion A1 and a second portion A2. For example, the first portion A1 and the second portion A2 may be implemented by different coatings on the same glass GR. For example, the first portion A1 may be formed by an IR-cut coating IRC covering on the glass GR, so the infrared light coming from the lens element 21 will be reflected by the IR-cut coating IRC, so the first portion A1 may be used as an IR-cut filter. The second portion A2 may be formed by an anti-reflection coating AFC covering on the glass GR, so the transparency of glass GR at the second portion A2 can be enhanced, and the second portion A2 may be used as a transparent filter that allows visible light and infrared light to pass through. Specifically, the filter member FM can be regarded as the combination of an IR-cut filter and a transparency-enhanced glass, and the IR-cut filter and transparency-enhanced glass has substantially the same thickness to prevent from misalignment of the focal lengths of the lens module 20.

In an embodiment, the electromagnetic driving assembly 25 is electrically connected to the circuit board 70. The electromagnetic driving assembly 25 is also connected to the filter member FM, and has a driving coil and one or more magnetic elements (e.g., magnets) which correspond to each other. The electromagnetic driving assembly 25 may be configured to move the filter member FM along a first direction D1 or a second direction D2 opposite to the first direction according to a control signal from the digital signal processor (DSP) 72 on the circuit board 70. In particular, when an appropriate current is provided from a power source (not shown) to the coil, a magnetic force is generated between the coil and the magnetic element, so that the electromagnetic driving assembly 25 can force the filter member FM to move.

Assuming that the night-vision optical device is operated in manual modes, in response to the night-vision optical device being switched to the IR-cut mode, the electromagnetic driving assembly 25 will drive the filter member FM to move to a first position, so that the first portion A1 overlaps the lens element 21 and the image sensor IM in the direction of the optical axis O. In addition, the first light source 42 and the second light source 52 will be deactivated in the IR-cut mode.

Referring to FIGS. 5A-5C, the aperture element 23 may include an aperture hole 231 and a filter portion 232. The aperture hole 231 may be a circle having an outer diameter L3 of 6.9 mm, and the filter portion 232 may have an outer diameter L4 of 38 mm. In addition, the thickness d1 of the aperture element 23 may be 1 mm. It should be noted that the dimensions of the aperture element 23 in the present invention are not limited to the aforementioned values. However, the more the thickness of the aperture element 23 is, the less the aperture element has the transmission percentage.

The curve of the transmission percentage of the filter portion 232 (i.e., black PMMA or PC) is shown in FIG. 5E, and a major portion (i.e., over 90%) the incident light having a wavelength longer than or equal to 700 nm (i.e., infrared light) can pass through the filter portion 232 while the incident light having a wavelength shorter than 700 nm will be blocked by the filter portion 232. Accordingly, the effective aperture of the aperture element 23 in the daytime (i.e., for visible light) can be regarded as F5.5 which is associated with the size of the aperture hole 231, and the effective aperture of the aperture element 23 at night can be regarded as F1.3 which is associated with the outer diameter of the filter portion 232.

Specifically, the light is strong enough in the daytime, and thus there is no need to collect infrared component of the incident light by the image sensor IM since the infrared component may degrade the image quality of the color image generated by the image sensor IM and the user may perceive this issue from the image displayed on the display module 30. In addition, the amount of incident light is reduced by the aperture element 23 in the daytime because it may affect the overall exposure result of the color image generated by the image sensor IM. Due the particular design of the aperture element 23 that is implemented by a piece of black PMMA (or PC) with an aperture hole 231, the visible light are almost blocked (i.e., over 99%) by the filter portion 232 in the daytime, and the incident light can pass through the aperture hole 231 and the lens element 21 (i.e., 100% of visible light and 100% of infrared light). The filter portion 232 can be regarded as a combination of a visible-light-blocking filter and an IR-pass filter.

Meanwhile, a major portion of the infrared light (e.g., over 90%) can pass through the filter portion 232 of the aperture element 23 and the lens element 21. Since the filter member FM is moved to the first position and the first portion A1 overlaps the lens element 21 and the image sensor IM in the IR-cut mode, no matter whether the infrared light is coming from the aperture hole 231 or from the filter portion 232, the infrared light is blocked by the IR-cut filter of the first portion A1. As a result, the image sensor IM will not receive any infrared component from the incident light in the IR-cut mode, and thus the image quality of the image generated by the image sensor IM in the daytime will be enhanced.

It should be noted that even if a smaller aperture (i.e., aperture hole 231) is used to reduce the amount of incident light, the intensity of the visible light in the daytime is still high enough to quickly oversaturate the pixels detected by the image sensor IM when a normal exposure value is used by the image sensor IM. In an embodiment, when the night-vision optical device 100 is switched to the IR-cut mode, the DSP 72 can control the exposure value that is used by the image sensor IM. For example, the exposure value of the image sensor IM may be exposure time or sensitivity.

More specifically, since there is no mechanical shutter in the lens module 20, the image sensor IM may use the "digital slow shutter (DSS)" or "automatic electronic shutter (AES)" technique to control the exposure time of each photosensitive element in the image sensor IM. For example, the exposure time of the image sensor IM in the IR-cut mode can be shortened to a first predetermined time (e.g., 0.0001 second) by a control signal from the DSP 72, and it indicates that the image sensor IM accumulates light for the first predetermined time in the IR-cut mode to generate an image signal and then sends the image signal to the DSP 72. Meanwhile, the image sensor IM will be reset by its own control circuit and is ready to acquire another image. The aforementioned operations of the image sensor IM is performed repeatedly. However, the DSP 72 will obtain the image signal generated by the image sensor IM at another frame rate (e.g., 30 or 60 frames per second), and display the obtained image signal on the display module 30. The DSP 72 may execute specific firmware, that is stored in a storage unit (not shown, such as a read-only memory) disposed on the circuit board 70, to set the exposure time of the image sensor IM for auto exposure.

In addition, the exposure time of the image sensor IM in the night mode can be increased to a second predetermined time (e.g., 1/60 or 1/30 second) by the control signal from the DSP 72, and it indicates that the image sensor IM accumulates light for the second predetermined time in the night mode to generate an image signal and then sends the image signal to the DSP 72. Meanwhile, the image sensor IM will be reset by its own control circuit and is ready to acquire another image. The aforementioned operations of the image sensor IM is performed repeatedly. Similarly, the DSP 72 will obtain the image signal generated by the image sensor IM at another frame rate (e.g., 30 or 60 frames per second), and display the obtained image signal on the display module 30.

In response to the night-vision optical device being switched to the night mode, the electromagnetic driving assembly 25 will drive the filter member FM to move to a second position, so that the second portion A2 (i.e., the transparent anti-reflection glass) overlaps the lens element 21 and the image sensor IM in the direction of the optical axis O. In addition, the first light source 42 and the second light source 52 will emit infrared light.

Specifically, the ambient light is weak in the early morning, evening, or night, and thus the intensity of the visible light is very low. Accordingly, there is need to collect infrared light that is emitted from the first light source 42 and the second light source 52 by the image sensor IM. Although there is little visible light passing through the aperture element 23, the visible light at night can be ignored in this case. The infrared light reflected from the scene may pass through the blocking portion 232 and the aperture hole 231. Because the filter member FM is moved to the second position and the second portion A2 (i.e., transparency-enhanced glass) overlaps the lens element 21 and the image sensor IM in the night mode, the image sensor IM will receive the infrared light reflected from the scene to generate an infrared image (e.g., a grey-scale image). The DSP 72 obtains the infrared image from the image sensor IM, and displays the infrared image on the display module 30.

In an embodiment, in response to the night-vision optical device 100 being switched to the automatic mode, the DSP 72 will determine whether to set the night-vision optical device 100 to enter the IR-cut mode or the night mode according to an ambient light level detected by the ambient light sensor 45. For example, the ambient light level can be regarded as "illuminance" that is expressed in units of LUX. If the DSP 72 determines to set the night-vision optical device 100 to enter the IR-cut mode, the DSP 72 will transmit a control signal to the electromagnetic driving assembly 25, and the electromagnetic driving assembly 25 will drive the filter member FM to move to a first position, so that the first portion A1 overlaps the lens element 21 and the image sensor IM in the direction of the optical axis O. If the DSP 72 determines to set the night-vision optical device 100 to enter the night mode, the DSP 72 will transmit another control signal to the electromagnetic driving assembly 25, and the electromagnetic driving assembly 25 will drive the filter member FM to move to a second position, so that the second portion A2 (i.e., the transparent anti-reflection glass) overlaps the lens element 21 and the image sensor IM in the direction of the optical axis O.

In some embodiments, a first threshold and a second threshold can be set by the DSP 72 to determine the current operation mode of the night-vision optical device 100, where the second threshold is greater than the first threshold. In response to the ambient light level around the night-vision optical device 100 detected by the ambient light sensor 45 being greater than the second threshold, it indicates that the night-vision optical device 100 is in a very bright scene, and the DSP 72 may set the night-vision optical device 100 to enter the IR-cut mode. Thus, the IR-cut filter of the filter member FM is used to block the incoming infrared light, and the image sensor IM will not receive any infrared component.

In response to the ambient light level around the night-vision optical device 100 detected by the ambient light sensor 45 being lower than the first threshold, it indicates that the night-vision optical device 100 is in a very dark scene, and the DSP 72 may set the night-vision optical device 100 to enter the night mode. Thus, the transparency-enhanced glass of the filter member FM is used to allow the incoming visible light and infrared light to pass through. Because the intensity of the visible light is very low, the accumulated intensity of the visible light during the exposure period performed by the photosensitive elements of the image sensor IM is still very low. Accordingly, the visible light can be ignored in the night mode.

In response to the ambient light level around the night-vision optical device 100 detected by the ambient light sensor 45 being between the first threshold T1 and the second threshold T2, it indicates that the night-vision optical device 100 is in a scene with intermediate intensity, such as in the early morning or near night, and the DSP 72 may keep the current operation mode of the night-vision optical device 100.

For example, assuming that the night-vision optical device 100 is in the IR-cut mode, when the ambient light around the night-vision optical device 100 is becoming weaker and weaker, the ambient light level detected by the ambient light sensor 45 may change from a value above the second threshold T2 to another value between the first threshold T1 and second threshold T2. In this situation, the DSP 72 may keep the current operation mode (i.e., the IR-cut mode) of the night-vision optical device 100 until the ambient light level detected by the ambient light sensor 45 is lower than the first threshold T1. Similarly, assuming that the night-vision optical device 100 is in the night mode, when the ambient light around the night-vision optical device 100 is becoming stronger and stronger, the ambient light level detected by the ambient light sensor 45 may change from a value lower than the first threshold T1 to another value between the first threshold T1 and second threshold T2. In this situation, the DSP 72 may keep the current operation mode (i.e., the night mode) of the night-vision optical device 100 until the ambient light level detected by the ambient light sensor 45 is greater than the second threshold T2.

In some other embodiments, a single threshold T can be set by the DSP 72 to determine the current operation mode of the night-vision optical device 100. For example, in response to the ambient light level around the night-vision optical device 100 detected by the ambient light sensor 45 being greater than or equal to the threshold T, it indicates that the night-vision optical device 100 is in a very bright scene, and the DSP 72 may set the night-vision optical device 100 to enter the IR-cut mode. Thus, the IR-cut filter of the filter member FM is used to block the incoming infrared light, and the image sensor IM will not receive any infrared component. In response to the ambient light level around the night-vision optical device 100 detected by the ambient light sensor 45 being lower than the threshold T, it indicates that the night-vision optical device 100 is in a very dark scene, and the DSP 72 may set the night-vision optical device 100 to enter the night mode. Thus, the transparency-enhanced glass of the filter member FM is used to allow the incoming visible light and infrared light to pass through.

Figure 6:
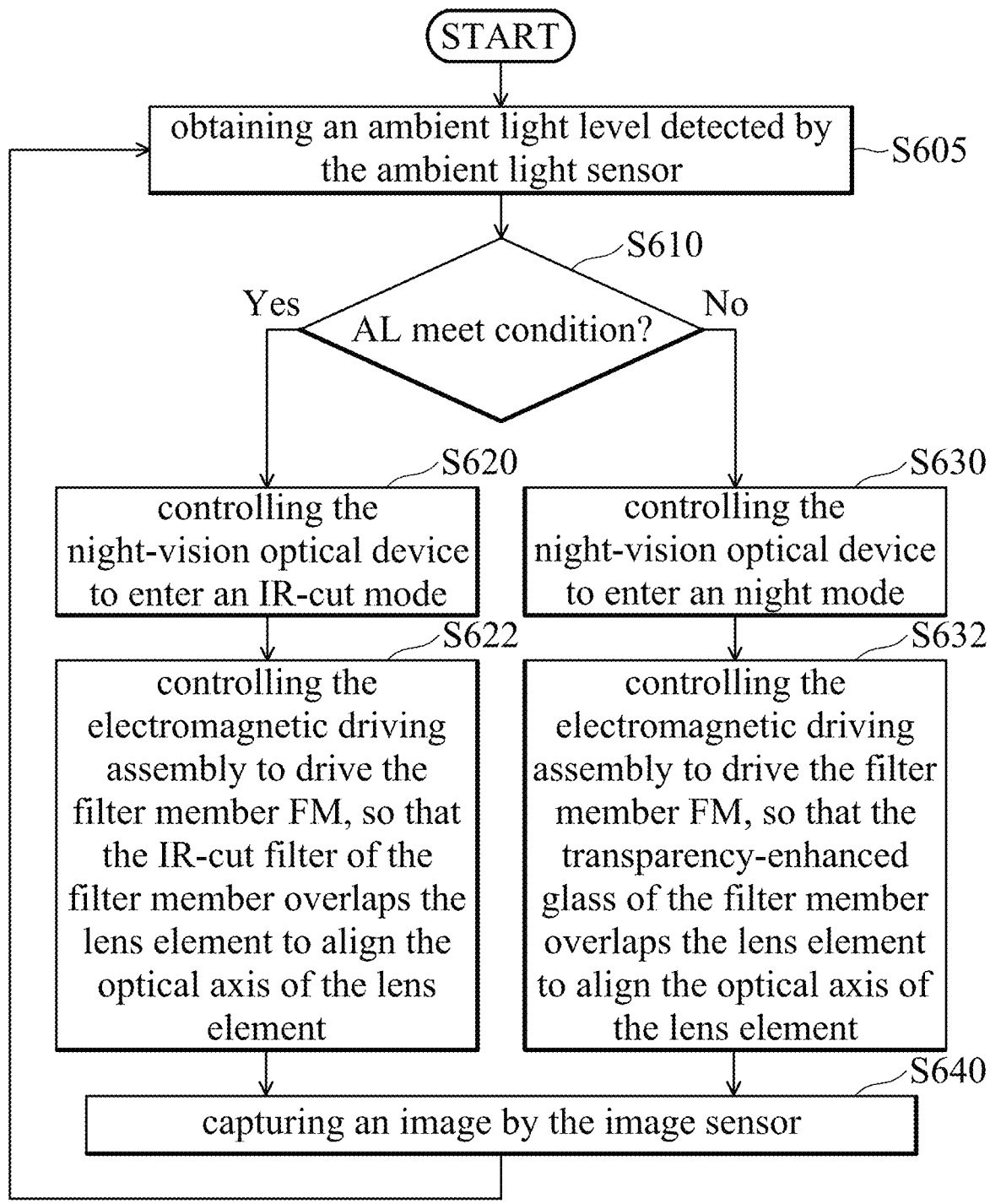
FIG. 6 is a flow chart of a method for forming an image of a scene in accordance with an embodiment of the invention.

FIG. 6 is a flow chart of a method of forming an image of a scene using automatic IR function in accordance with an embodiment of the invention.

In step S605, an ambient light level detected by the ambient light sensor 45 is obtained.

In step S610, it is determined whether the ambient light level satisfies a predetermined condition. If the ambient light level satisfies the predetermined condition, step S620 is performed. If the ambient light level does not satisfy the predetermined condition, step S630 is performed. For example, in some embodiments, a single threshold T is used, and the predetermined condition may be the ambient light level is higher than or equal to a threshold.

In step S620, the DSP 72 controls the night-vision optical device to enter an IR-cut mode. For example, when the ambient light level detected by the ambient light sensor 45 is higher than or equal to the threshold T, it indicates that the night-vision optical device 100 is in a very bright scene.

In step S622, the DSP 72 controls the electromagnetic driving assembly 25 to drive the filter member FM, so that the IR-cut filter (i.e., the first portion A1) of the filter member overlaps the lens element 21 and the image sensor IM in the direction of the optical axis of the lens element 21.

In step S630, the DSP 72 controls the night-vision optical device to enter a night mode. For example, when the ambient light level detected by the ambient light sensor 45 is lower than the threshold T, it indicates that the night-vision optical device 100 is in a very dark scene.

In step S632, the DSP 72 controls the electromagnetic driving assembly 25 to drive the filter member FM, so that the transparency-enhanced glass (i.e., the second portion A2) of the filter member overlaps the lens element 21 and the image sensor IM in the direction of the optical axis of the lens element 21.

In step S640, the image sensor IM captures an image. For example, if the night-vision optical device 100 is in the IR-cut mode, the incident light (i.e., including visible light and infrared light) will pass through the aperture hole 231, and the filter portion 232 will block the visible light to reduce the amount of incident light. Then, the IR light is blocked by the IR-cut filter of the filter member FM, and the image sensor IM can generate a color image using the color components in the visible light. In addition, if the night-vision optical device 100 is in the night mode, the infrared light can pass through the aperture hole 231 and the filter portion 232, and the intensity of the visible light is very low which can be ignored. Then, the IR light can pass through the transparency-enhanced glass of the filter member FM, and the image sensor IM can generate a grey-scale image using the detected infrared component.

Figure 7:
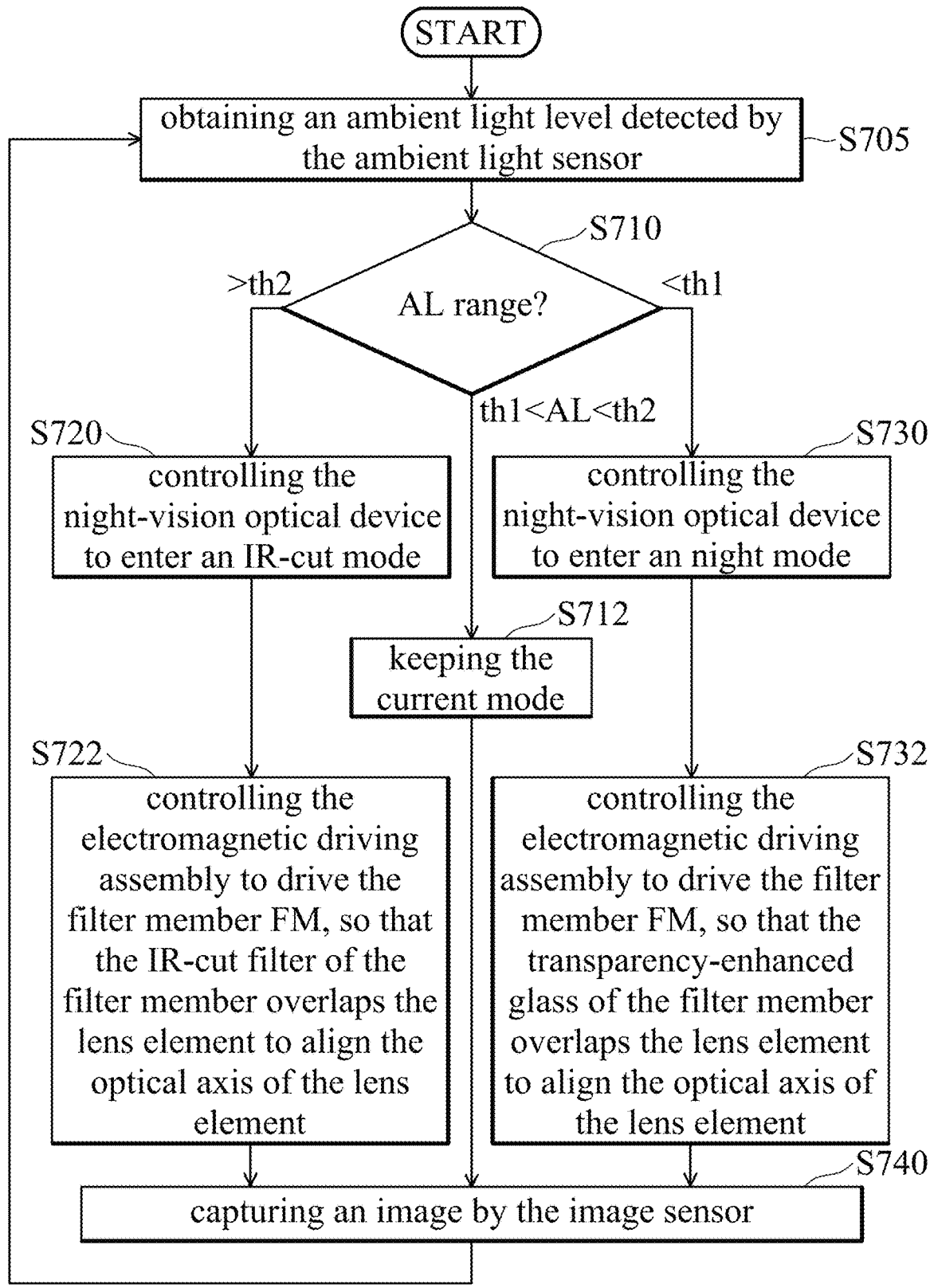
FIG. 7 is a flow chart of a method for forming an image of a scene in accordance with another embodiment of the invention.

FIG. 7 is a flow chart of a method for forming an image of a scene in accordance with another embodiment of the invention.

The flow in FIG. 7 is similar to that in FIG. 6, the difference is that step S710 determines the range of the ambient light level AL. When the ambient light level is higher than the second threshold th2, step S720 is performed. When the ambient light level AL is lower than the first threshold th1, step S730 is performed. When the ambient light level AL is between the first threshold th1 and second threshold th2, step S712 is performed to keep the current mode. The details of other steps in FIG. 7 can be referred to in the embodiment of FIG. 6.

In summary, a night-vision optical device is provided, comprising: a main body, an ambient light sensor, a lens module, and a display module. The ambient light sensor is configured to detect ambient light level around the night-vision optical device. The lens module is disposed on one side of the main body, wherein the lens module includes: an aperture element, comprising an aperture hole and a filter portion; a lens element; an electromagnetic driving assembly, comprising a filter member having a first portion and a second portion; an image sensor; and a digital signal processor. The display module is disposed in the main body and electrically connected to the lens module, and configured to display an image captured by the image sensor. In response to the ambient light level satisfying a predetermined condition, the digital signal processor controls the night-vision optical device to enter a first mode, and controls the electromagnetic driving assembly to drive the first portion of the filter member to a first position to align an optical axis of the lens element In response to the ambient light level not satisfying a predetermined condition, the digital signal processor controls the night-vision optical device to enter a second mode, and controls the electromagnetic driving assembly to drive the second portion of the filter member to the first position to align the optical axis of the lens element.

When using a conventional night-vision optical device (e.g., binocular or monocular), the user has to manually install a filter cover on the lens module when the user wants to view the image in the daytime, and manually remove the filter cover from the lens module when the user wants to view the infrared image at night. In addition, the filter cover of the conventional night-vision device is easy to get lost. Therefore, the night-vision optical device in the present invention can solve the problem of the conventional night-vision optical device for manually installing the filter cover on the lens module in the daytime and removing the filter cover from the lens module at night, and the user can no longer care about the missing filter cover, thereby facilitating convenience of usage of the night-vision optical device.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A night-vision optical device, comprising:
   a main body;
   an ambient light sensor, configured to detect ambient light level around the night-vision optical device;
   a lens module, disposed on one side of the main body, wherein the lens module comprises:
      an aperture element, comprising an aperture hole and a filter portion;
      a lens element;
      an electromagnetic driving assembly, comprising a filter member having a first portion and a second portion;
      an image sensor; and
      a digital signal processor;
   a display module, disposed in the main body and electrically connected to the lens module, and configured to display an image captured by the image sensor; and
   wherein in response to the ambient light level satisfying a predetermined condition, the digital signal processor controls the night-vision optical device to enter a first mode, and controls the electromagnetic driving assembly to drive the first portion of the filter member to a first position to align an optical axis of the lens element,
   wherein in response to the ambient light level not satisfying a predetermined condition, the digital signal processor controls the night-vision optical device to enter a second mode, and controls the electromagnetic driving assembly to drive the second portion of the filter member to the first position to align the optical axis of the lens element.

2. The night-vision optical device as claimed in claim 1, wherein the aperture hole is located at the center of the aperture element, and has a first outer diameter, wherein the filter portion has a second outer diameter, and the second outer diameter is longer than the first outer diameter.

3. The night-vision optical device as claimed in claim 1, wherein the filter portion is a ring-shaped element made of black PMMA (polymethyl methacrylate) or PC (polycarbonate).

4. The night-vision optical device as claimed in claim 2, wherein the second outer diameter is 38 mm, and the first outer diameter is 6.9 mm, and the thickness of the aperture element is 1 mm, and dimensions of the first outer diameter, the second outer diameter, and the thickness of the aperture element are adjusted according to practical requirements of the night-vision optical device.

5. The night-vision optical device as claimed in claim 1, wherein the first portion and the second portion of the filter member are implemented by an IR-cut coating and an anti-reflection coating covering on the same glass.

6. The night-vision optical device as claimed in claim 1, wherein the first mode is an IR-cut mode, and visible light is blocked by the filter portion, and an infrared component of an incident light is blocked by the IR-cut filter.

7. The night-vision optical device as claimed in claim 1, wherein the second mode is a night mode, and the infrared component passes through the aperture element, the lens element, and the second portion, and the image sensor captures the infrared component to generate an infrared image.

8. The night-vision optical device as claimed in claim 4, wherein the aperture element has a first effective aperture of F5.5 for the visible light in the first mode, and has a second effective aperture of F1.3 for the infrared component in the second mode.

9. The night-vision optical device as claimed in claim 1, wherein the digital signal processor executes specific firmware to set a first exposure value of the image sensor in the first mode, and set a second exposure value of the image sensor in the second mode,
   wherein the second exposure value is greater than the first exposure value.

10. The night-vision optical device as claimed in claim 9, wherein the first exposure value and the second exposure value represent a first exposure time and a second exposure time, respectively,
    wherein the image sensor uses the first exposure time or the second exposure time set by the digital signal processor for an automatic electronic shutter to capture the image.

11. The night-vision optical device as claimed in claim 1, wherein a first central axis of the aperture element, an optical axis of the lens element, a second central axis of the image sensor, and a third central axis of the display module are coincidental.

12. The night-vision optical device as claimed in claim 1, further comprising:
    a first light source assembly, including a first light source and a first lens, and configured to emit a first infrared light in the night mode; and
    a second light source assembly, including a second light source and a second lens, and configured to emit a second infrared light in the night mode;
    wherein the first light source assembly and the second light source assembly are respectively disposed on two sides of the lens module, the first light source emits a long-range light through the first lens, and the second light source emits a close-range light through the second lens, wherein the focal length of the first lens is greater than the focal length of the second lens.

\* \* \* \* \*